United States Patent [19]
Davis

[11] 4,146,151

[45] Mar. 27, 1979

[54] AUTOMATIC CHIP OR BUTTON PLACER

[76] Inventor: Edward H. Davis, 695-7 Water St., Fitchburg, Mass. 01420

[21] Appl. No.: 779,188

[22] Filed: Mar. 18, 1977

[51] Int. Cl.$^2$ .............................................. B65G 59/06

[52] U.S. Cl. .................................... 221/264; 221/273; 133/5 R

[58] Field of Search ................................ 221/263-265, 221/273, 269, 270, 186, 190; 222/361, 362; 273/129 R, 129 E, 129 F, 144 R, 144 A; 133/5 R, 5 A, 5 B, 6; 206/536, 537

[56] References Cited

U.S. PATENT DOCUMENTS

| | | | |
|---|---|---|---|
| 3,300,087 | 1/1967 | Kuypers | 221/273 |
| 3,313,452 | 4/1967 | Katz | 221/264 |
| 3,332,576 | 7/1967 | Hamilton | 221/264 |
| 3,854,626 | 12/1974 | Krechmar | 221/264 |

FOREIGN PATENT DOCUMENTS

| | | | |
|---|---|---|---|
| 141474 | 4/1920 | United Kingdom | 221/263 |

*Primary Examiner*—Allen N. Knowles
*Assistant Examiner*—H. Grant Skaggs
*Attorney, Agent, or Firm*—Charles R. Fay

[57] ABSTRACT

A device for storing in a column chips or buttons or the like, and dispensing the same through the bottom of the device, by a selection of either of two different means one of which is a depressible finger piece and the other a depressible plunger actuated by placing the device against a table top or other flat object.

4 Claims, 3 Drawing Figures

AUTOMATIC CHIP OR BUTTON PLACER

BACKGROUND OF THE INVENTION

This invention is for the automatic placing and dispensing of chips or buttons particularly for playing the game of bingo but of course it will have many other applications. As is well-known to bingo players it is sometimes difficult to keep up with the game by placing the chips or buttons at the correct locations on the board when one has a hand full of such chips or buttons for the express purpose of placing them more quickly; and it is the object of the present invention to provide an improved dispensing device of the class described.

SUMMARY OF THE INVENTION

A generally tubular member is provided for the reception of a column of chips or buttons. At the lower end thereof there is a laterally slidable slide ring which is spring pressed to what can be referred to as a closed position because it stops the chips or buttons from descending. This slide ring can be pressed digitally against the action of the spring to release the lowermost chip only, to be positioned on the playing board.

This dispensing slide ring is also actuatable by means of a plunger simply by placing the device lightly down on the table top or other surface where the chips are to be placed, and it comprises a spring pressed plunger and a cam which acts upon the slide ring moving it to the dispensing position the same as above-described was done by the finger.

PREFERRED EMBODIMENT OF THE INVENTION

Figure 1:
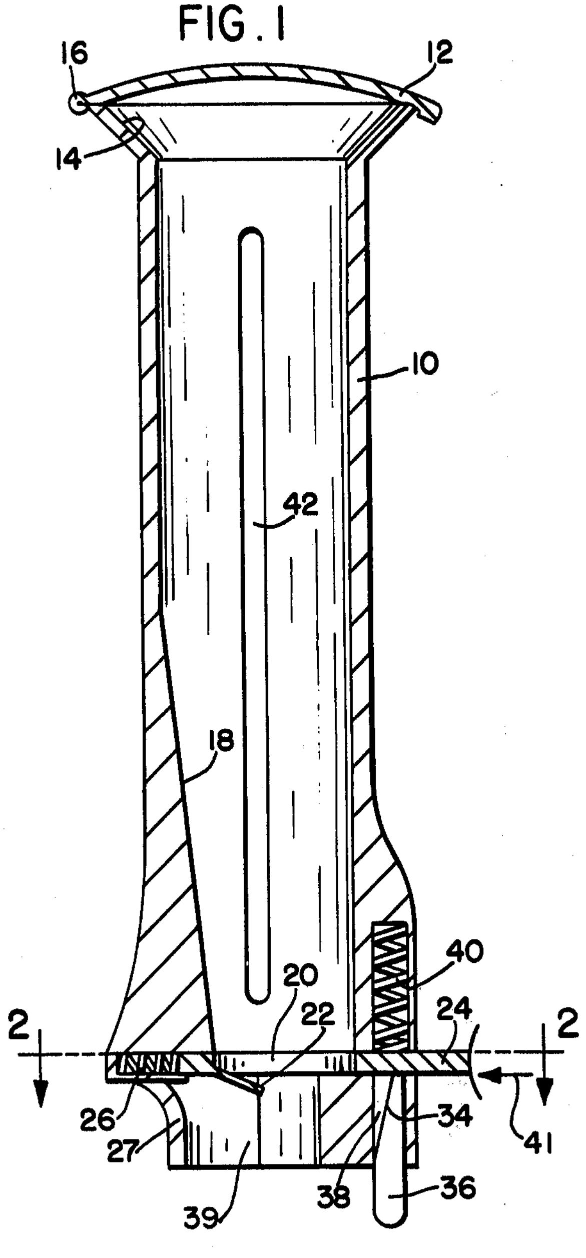
FIG. 1 is a cut away view illustrating the new automatic chip or button placer or dispenser.

Reference numeral 10 indicates an elongated tubular member preferably having a snap on type cap 12 at the top thereof and a funnel 14 aiding in loading of the device and storing of a number of extra chips which will fall in place automatically. The cap 12 may be hinged at 16 if this is desired.

The tube 10 is not exactly cylindrical except for the upper portion thereof; at its lower end the inside wall thereof trends inwardly as at 18 to better position the chips with reference to a dispensing slide ring which is indicated generally at 20.

Figure 2:
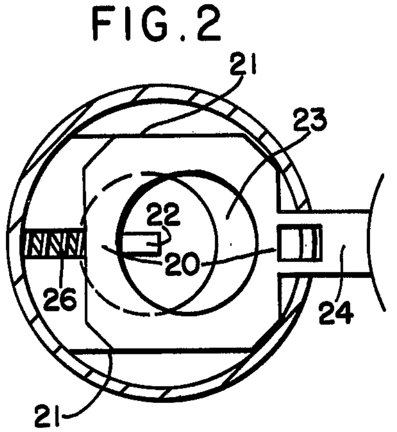
FIG. 2 is a section on line 2—2 of FIG. 1.

The dispensing slide ring is provided with a lip 22 which slants down as to catch a chip on returning should it be slightly tilted down and position it. The slide ring has a track or path in a slide or guide 21 on a base 23 and it is shown in FIG. 1 as at its chip-loading right hand position. It can however be moved to the left under influence of a finger button 24 connected thereto, and there is a spring 26 at the opposite end of the slide ring which tends to maintain it in the "closed" and loading position shown. The slide ring may however be displaced in a left hand direction under the influence of depression of the plunger 36 and in this case the lowermost chip in the stack of chips is released by the lip and base and will fall upon the playing surface wherever directed by the guide spout indicated at 39. The proportions of the parts are such as seen in FIG. 2 that only a single chip is allowed to be dispensed upon actuation of said slide ring.

Figure 3:
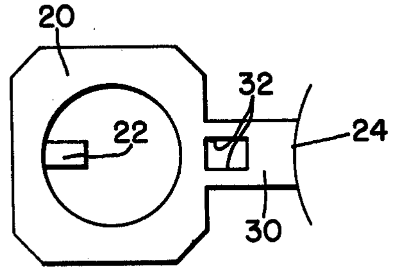
FIG. 3 is a detail of the finger actuator.

The actuating means in the form of a finger piece or button 24, see FIG. 3, comprises a main portion 30 and a rectangular opening for the purpose of accommodating a tapered cam portion 34 of the vertical plunger 36 which may be provided with any kind of stop means preventing it from dropping out of its upright housing 38. In the housing 38 there is a spring 40 for maintaining the plunger in its down position shown in FIG. 1, but when the dispenser 10 is placed upon a table top or similar surface, the plunger 36 is forced up against the spring 40, and the cam 34 bears against the slide ring 20 at the right hand side thereof moving it in the direction of the arrow (41) in FIG. 1 to the chip releasing position with respect thereto.

If desired a slot or window 42 may be provided so as to observe a number of chips or buttons in the tube and other departures may be made from the exact disclosure shown without departing from the scope of the invention.

I claim:

1. A chip or button dispensing device comprising an elongated hollow body having a top entrance end, and a bottom dispensing end,
   - a linearly reciprocable slide ring extending transversely of said tubular body and in a plane at right angles to the latter at the dispensing end thereof, a spring, said slide ring normally being in the position held by the spring for withholding stacked chips or buttons in the tube, but being manually movable to clear a chip or button and allow the same to descend through the ring in the plane thereof to be dispensed,
   - a spring biassed plunger on the hollow body said plunger depending in part from the hollow body and being adapted to be depressed upon engagement with an underlying flat surface, and means on the plunger engaging with said slide ring for moving the latter to dispensing position upon depression of the plunger, thereby depositing a chip or button flatly on the flat surface in a predetermined position, and further including actuating means to be engaged by the finger of the user and connected to the slide ring to move the slide ring to a dispensing position without any action of the plunger.

2. The dispenser of claim 1 including an interior lip on said slide ring.

3. The dispenser of claim 2 wherein said lip is tapered downwardly in the direction of dispensing to catch and position, a chip should it be slightly tilted downward.

4. The dispenser of claim 1 wherein the plunger forms a right angle with respect to the plane of the ring.

* * * * *